United States Patent [19]

Friello et al.

[11] 4,208,431

[45] Jun. 17, 1980

[54] LONG-LASTING CHEWING GUM HAVING GOOD PROCESSIBILITY AND METHOD

[75] Inventors: Dominick R. Friello, Danbury, Conn.; Frank Witzel, Spring Valley, N.Y.; K. Warren Clark, Brewster, N.Y.; Donald A. M. Mackay, Pleasantville, N.Y.

[73] Assignee: Life Savers, Inc., New York, N.Y.

[21] Appl. No.: 953,151

[22] Filed: Oct. 20, 1978

Related U.S. Application Data

[63] Continuation-in-part of Ser. No. 903,342, May 5, 1978, abandoned.

[51] Int. Cl.² .............................................. A23G 3/30
[52] U.S. Cl. ........................................ 426/3; 426/658; 426/548
[58] Field of Search ................................ 426/3–6, 426/548, 658

[56] References Cited

U.S. PATENT DOCUMENTS

| | | | |
|---|---|---|---|
| 1,711,281 | 4/1929 | Mowrey | 426/3 |
| 3,262,784 | 7/1966 | Bucher et al. | 426/3 |
| 3,352,689 | 11/1967 | Bilotti | 426/3 |
| 3,655,866 | 4/1972 | Bilotti | 426/3 |
| 3,795,744 | 3/1974 | Ogawa et al. | 426/3 |
| 3,851,073 | 11/1974 | Cook | 426/548 |
| 3,973,041 | 8/1976 | Du Ross | 426/3 |
| 3,982,023 | 9/1976 | Bahoshy | 426/3 |

FOREIGN PATENT DOCUMENTS

899143  5/1972  Canada ................................ 426/658

*Primary Examiner*—Jeanette M. Hunter
*Attorney, Agent, or Firm*—Lawrence S. Levinson; Burton Rodney

[57] ABSTRACT

A chewing gum which includes a water-soluble phase formed of aqueous softener, such as sorbitol syrup, and a first sweetener, such as sorbitol or sugar, in particulate form dispersed throughout the aqueous softener, and a relatively water-insoluble phase formed of a plurality of separate and distinct masses suspended in and dispersed throughout the water-soluble phase, each of the masses being formed of particles of gum base and particles of a second sweetener, such as mannitol and/or sorbitol or sugar, enveloped by particles of gum base.

The relatively water-insoluble phase including gum base particles and/or the water-soluble phase further includes hydrogenated starch hydrolysate.

31 Claims, 4 Drawing Figures

LONG-LASTING CHEWING GUM HAVING GOOD PROCESSIBILITY AND METHOD

Reference to Other Applications

This application is a continuation-in-part of application Ser. No. 903,342 filed May 5, 1978, now abandoned.

FIELD OF THE INVENTION

The present invention relates to sugar-containing and sugarless chewing gums which have improved sweetness retention, sweat resistance and processibility.

BACKGROUND OF THE INVENTION

Figure 4:
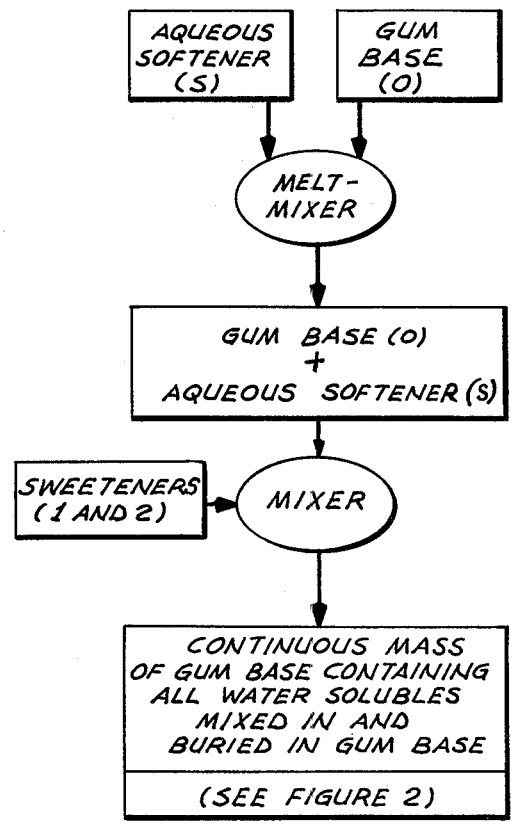
FIG. 4 is a schematic flow diagram illustrating the steps employed in making the prior art chewing gum as shown in FIG. 2.

Conventional chewing gum generally includes gum base to which are added water-soluble sweeteners, for example, various sugars such as sucrose and dextrose, corn syrup, sorbitol and/or artificial sweeteners such as sodium or calcium saccharin, cyclamates, emulsifiers such as lecithin, mono- and diglycerides, and flavors. The chewing gum is generally prepared (as shown in FIG. 4) by melting the gum base (O), mixing corn syrup or other aqueous softener (S) for 3 to 5 minutes with the gum base followed by the addition of solid sweeteners (1) and (2), for example sugar, or sorbitol, and flavor and mixing for 5 minutes. The chewing gum is removed from the kettle, rolled and cut to the desired shape.

Figure 2:
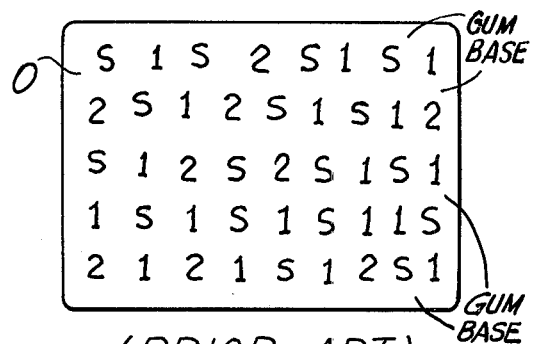
FIG. 2 is a schematic microscopic representation of a portion of a chewing gum similar in composition to the chewing gum shown in FIG. 1 prepared according to conventional methods of manufacture.

As the gum is processed as described above, if remains continuous throughout the entire procedure. The result is that the final chewing gum product is a continuous mass of gum base (O) which envelopes the sugar or other sweeteners (1) and (2) as well as the aqueous softener (S) so as to provide a matrix of gum base (O) containing sweeteners (1) and (2) and aqueous softener (S) (see FIG. 2).

The gum so-produced initially provides a desirable strong sweet taste which declines rapidly during the first three to five minutes of chewing to a very slight imperceptible level of sweetness. After about five minutes or less, substantially all sweetness is gone. Accordingly, there clearly is a need for a chewing gum which possesses long-lasting sweetness, that is, sweetness which lasts for seven to eight minutes or longer. Furthermore, a need exists for a long-lasting sugarless gum which contains only natural sweeteners and no artificial sweeteners.

DETAILED DESCRIPTION OF THE INVENTION

Figure 1:
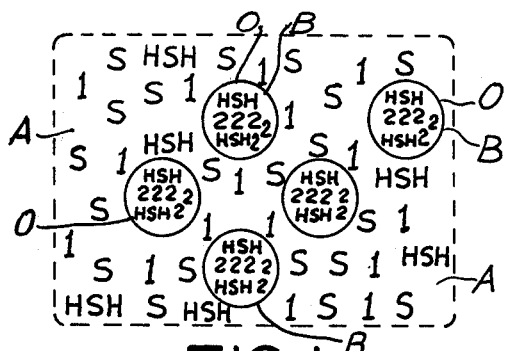
FIG. 1 is a schematic microscopic representation of a portion of the chewing gum of the invention.
Figure 3:
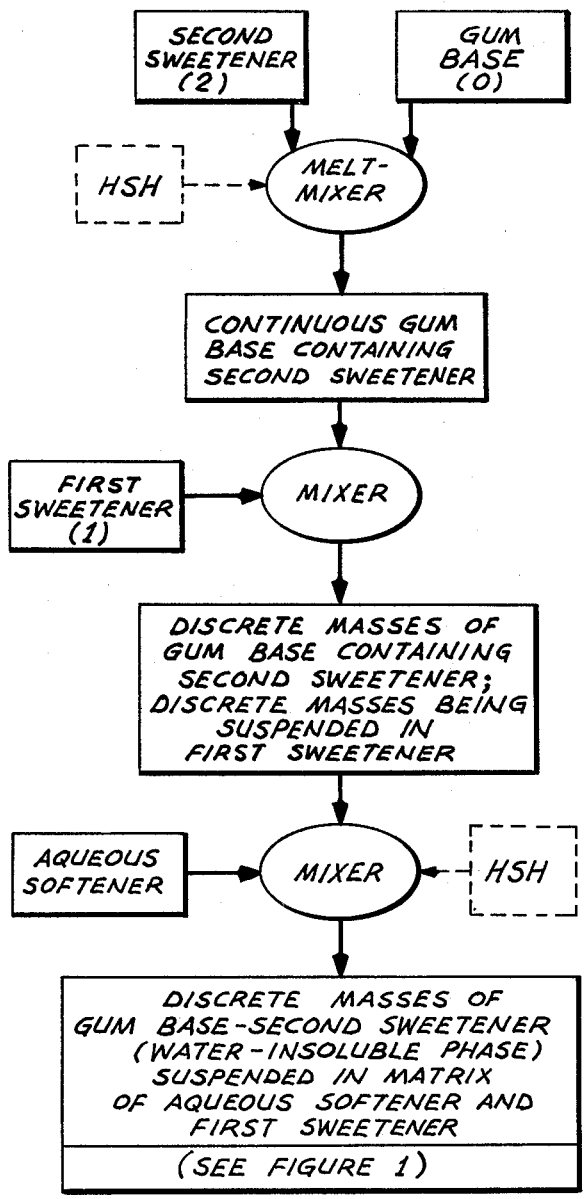
FIG. 3 is a schematic flow diagram illustrating the steps employed in making the chewing gum of the invention as shown in FIG. 1.

Referring to FIGS. 1 and 3, a chewing gum is provided which has long-lasting sweetness, good sweat resistance, good processibility and which includes a water-soluble (or continuous) phase (A) formed of aqueous softener (S), such as sorbitol syrup, and a first sweetener (1), such as sorbitol or sugar, in particulate form dispersed throughout the aqueous softener (S) and optionally hydrogenated starch hydrolysate (HSH) to serve as a binder to improve processibility, dispersed throughout the aqueous softener; and a relatively water-insoluble (or discontinuous) phase (B) formed of a plurality of separate and distinct masses suspended in and dispersed throughout the water-soluble phase (A), each of said masses being formed of gum base (O) and particles of a second sweetener (2), such as mannitol and/or sorbitol or sugar, and optionally hydrogenated starch hydrolysate to improve processibility, enveloped by or sealed in particles of gum base.

The first sweetener (1) and aqueous softener (S) provide the initial impact of sweetness while the gum base (O) provides an envelope or protective vehicle for the second sweetener (2) to control and slow down release of the second sweetener, thereby providing extended sweetness after the initial sweetness impact has subsided.

The hydrogenated starch hydrolysate may be present in either or both of the water-soluble phase or the water-insoluble phase to improve processibility, that is, to improve cohesivity of the chewing gum during the manufacture and especially to facilitate sheeting of the gum and manufacture thereof in stick form.

It has now been found that the sweetness of chewing gum can be prolonged by incorporating particulate sweetener (that is, the second sweetener as referred to above) in the gum base in a manner such that particles of the second sweetener are dispersed in, enveloped by, trapped in and/or otherwise protected by the gum base so that solubilization of the second sweetener in any of the latter added chewing gum ingredients will be held to a minimum. This may be accomplished by incorporating the particles of second sweetener in melted gum base prior to mixing the gum base with plasticizers, aqueous softeners, moisturizers, additional sweeteners or any other material in which the (second) sweetener dispersed in the gum base may be soluble.

The second sweetener so-dispersed and sealed in the gum base is substantially retained in the gum base and not readily solubilized therefrom during chewing, but undergoes only slow and controlled release into the saliva. This is distinct from conventional chewing gum manufacture wherein sweetener, such as sugar or sorbitol or other sweetener is normally added to gum base after corn syrup, sorbitol syrup, or other aqueous softeners have been added; the aqueous softeners cause solubilization of the sweetener from the gum base with the result that the sweetness is practically exhausted after only 3 to 5 minutes of chewing.

The chewing gum of the invention may be provided with an initial burst of sweetness by admixing an auxiliary or first sweetener, which may be a second portion of the second sweetener, and/or other sweetener, with the gum base (containing the second sweetener already dispersed therein). As the mixing progresses the gum base containing the second sweetener dispersed therein is torn apart into discrete masses and suspended in the first sweetener. Thereafter, plasticizer or aqueous softener in the form of a polyhydric alcohol-type syrup is admixed with the discrete masses suspended in the first sweetener, thereby imparting a unique, soft nougat-like structure which allows for a good initial burst of sweetness and flavor and excellent extended sweetness duration of up to 8 minutes or more with good sweat resistance.

It will be appreciated that the first or auxiliary sweetener added to the gum base already containing the second sweetener interdispersed therein will not impart the prolonged sweetness to the chewing gum, but is only present for initial sweetness impact; prolonged sweetness is attained only through the second sweetener which is initially separately interdispersed and sealed in the gum base.

Thus, as seen herein, the present invention provides both sugar-containing and sugarless chewing gums having long-lasting sweetness. Furthermore, the present invention provides long-lasting sugarless chewing gums which need not contain artificial sweeteners but may include only natural sweeteners, such as sorbitol, mannitol and/or xylitol and the like; the "natural" sugarless chewing gum provides long-lasting sweetness without the need for saccharin due to its unique structure and process of manufacture.

The term "first sweetener" or "auxiliary sweetener" as employed herein refers to the sweetener initially extracted upon chewing and which forms a water-soluble phase with the aqueous softener.

The term "second sweetener" as employed herein refers to the sweetener which is only slowly extracted primarily after the first sweetener has been solubilized upon chewing; the second sweetener together with the gum base forms a water-insoluble phase.

In carrying out the method of the invention (as seen in FIG. 3), the gum base is first melted and the second sweetener as well as flavors, food acids (where desired), and emulsifiers or softeners, such as lecithin, are thoroughly mixed for at least two minutes in the melted gum base (which is maintained at a temperature preferably not exceeding 200° F.) to effect uniform distribution thereof and seal the second sweetener in the gum base. In one embodiment of the invention, hydrogenated starch hydrolysate is added to and mixed in the gum base at this stage, the gum base being in the form of a continuous cohesive mass. At this stage the auxiliary or first sweetener, preferably in particulate form, which may be another portion of the same sweetener as the second sweetener, or other sweetener, is added to the continuous mass with mixing being continued for from 1 to 5 minutes, thereby causing the continuous mass to be torn apart into discrete, separate masses of gum base containing second sweetener (together with hydrogenated starch hydrolysate, if previously added) sealed therein said discrete masses being suspended in particles of first sweetener to form a heterogeneous mass. The aqueous plasticizer or softener and optionally hydrogenated starch hydrolysate are added to and mixed with the heterogeneous mass for from 1 to 5 minutes. Thereafter, the solid flavor, for example, encapsulated or fixed on dextrin or gum arabic, and water-soluble acids may be added and mixed with the gum mass to form a smooth chewing gum which may be rolled, sheeted, scored and cut into desired shapes.

Depending upon when the hydrogenated starch hydrolysate is added, it will be present in the gum base or discontinuous phase and/or in the aqueous softener or continuous phase. In either phase, the hydrogenated starch hydrolysate will facilitate processibility and especially sheeting; it serves to impart and increase cohesivity of the gum base particles or chewing gum itself and thus insures that the gum base or chewing gum will not tear apart and clog up and break down machinery during manufacture.

It will be appreciated that when the aqueous plasticizer or softener is added after the mix is in discontinuous discrete masses or clumps containing second sweetener sealed therein and suspended in the auxiliary or first sweetener, substantially all water from the aqueous plasticizer, such as sorbitol syrup, will be taken up by the water-soluble particulate auxiliary or first sweetener, and the water will not be available for solubilizing the second sweetener sealed in the gum base. The second sweetener initially added to the melted gum base to form a continuous mass will be substantially buried in the gum base and protected from any solubilization (for example, due to aqueous polyol syrup) even after the gum base mix is torn into discrete masses or clumps. Thus, the present invention provides a chewing gum and method for making the same wherein long-lasting sweetness is obtained without the need for coating, encapsulating, and/or integrating water-insoluble polymeric substances, such as polyvinyl esters on to the particles of sweetener and without affecting the initial sweetness impact.

The hydrogenated starch hydrolysates suitable for use herein to be added as part of the discontinuous gum base phase or as part of the continuous aqueous softener phase may be a hydrogenated corn syrup or hydrogenated starch hydrolysates of varying dextrose equivalents (DE), such as disclosed in U.S. Pat. Re. No. 26,959 and U.S. Pat. No. 3,556,811 as well as various hydrogenated glucose syrups and/or reconstituted powders which contain sorbitol, hydrogenated disaccharides, tri- to hexa-hydrogenated saccharides, and hydrogenated higher polysaccharides, or mixtures of any two or more of the above.

The hydrogenated glucose syrups or hydrogenated starch hydrolysates and/or powders thereof may be produced by catalytic hydrogenation of standard glucose syrups (acid and/or enzyme converted) to the point where all the glucose end groups of the saccharides are reduced to alcohols, that is, dextrose to sorbitol. In the case of hydrogenated glucose syrups, the total solids contents will range from about 72 to about 80% which solids are made of from about 4 to about 20% sorbitol, from about 20 to about 65% hydrogenated disaccharides (that is, maltitol), from about 15 to about 45% tri- to hepta-hydrogenated saccharides, and from about 10 to about 35% hydrogenated saccharides higher than hepta.

Where the hydrogenated starch hydrolysate is employed in the discontinuous-gum base phase, it will be present in amounts ranging from about 5 to about 40% and preferably from about 8 to about 35% by weight of the gum base, and from about 0.5 to about 15%, and preferably from about 1 to about 12% by weight of the chewing gum.

Where the hydrogenated starch hydrolysate is employed in the continuous-aqueous softener phase, it will be present in amounts ranging from about 0.5 to about 100%, and preferably from about 15 to about 50% by weight of the gum base, and from about 0.1 to about 20%, and preferably from about 3 to about 10% by weight of the chewing gum.

Examples of the second sweeteners which may be employed herein and interdispersed throughout and sealed in discrete masses of gum base to provide prolonged sweetness include, but are not limited to, one or more of the following: natural sweeteners, such as sucrose, glucose, fructose, fructose syrup, glycyrrhizin, molasses, caramal, monoammonium salt of glycyrrhizin, mono-, di- or tri-sodium salt of glycyrrhizin, mono-, di- or tri-potassium salt of glycyrrhizin, and calcium salt of glycyrrhizin; sugar alcohols, such as mannitol, sorbitol, xylitol, maltitol; artificial sweeteners, such as calcium saccharin, sodium saccharin, free acid form of saccharin, ammonium saccharin, aspartame (L-aspartyl-L-phenylalanine methyl ester), naringin dihydrochalcone, neohesperidin dihydrochalcone, cyclamic acid, sodium cyclamate, calcium cyclamate, *Dioscoreophyllum cumminsii* (Serendipity Berry), *Stevia rebaudiana* (Stevioside), *Richardella dulcifica* (Miracle Berry), or thaumatin, with sucrose, mannitol and/or sorbitol being preferred.

The first (auxiliary) sweetener employed with the aqueous softener for initial sweetness impact will preferably be easily extractable from the chewing gum and may include one or more of the following: natural sweeteners, such as sugars, sugar alcohols, such as, xylitol, sorbitol, mannitol, maltitol, or mixtures thereof, or sugar containing materials, for example, monosaccharides, such as arabinose, xylose, ribose, glucose, mannose, galactose, fructose, dextrose, or sorbose or mixtures of two or more of the foregoing monosaccharides; disaaccharides, such as, sucrose, for example, cane or beet sugar, lactose, maltose or cellobiose; and polysaccharides; artificial sweeteners, such as the free acid form of saccharin, calcium saccharin, ammonium saccharin, sodium saccharin, aspartame (L-aspartyl-L-phenylalanine methyl ester), naringin dihydrochalcone, neohesperidin dihydrochalcone, cyclamic acid, sodium cyclamate and calcium cyclamate, as well as other sweeteners such as *Dioscoreophyllum cumminsii* (Serendipidity Berry), *Stevia rebaudiana* (Stevioside), *Richardella dulcifica* (Miracle Berry), thaumatin and the like.

The plasticizer or aqueous softener, which together with the first sweetener forms the so-called water-soluble phase of the chewing gum (as opposed to the oil- or water-insoluble gum base-phase which includes the second sweetener dispersed therein) will preferably take the form of a substantially non-hygroscopic material such as a polyhydric alcohol in liquid form (xylitol syrup, sorbitol syrup or maltitol syrup).

The aqueous softener or plasticizer employed herein serves as a matrix which surrounds the islands of gum base containing the second sweetener and functions as a binder for such islands of gum base-second sweetener, and the particles of first sweetener. Inasmuch as the aqueous softener (or binder) lies on the gum surface (in effect coating the masses or islands of gum base), it is preferred that the hygroscopicity of the aqueous softener be as low as possible. Thus, corn syrup which is highly hygroscopic and will readily absorb moisture causing sweating problems in hot, humid climates, is to be avoided where possible. It is preferred that the aqueous softener employed herein even in sugar-based gum be sorbitol syrup alone or in admixture with a syrup mixture containing sorbitol.

The binding action of the aqueous softener, for example, sorbitol syrup, may be enhanced by adding a thickener thereto in an amount within the range of from about 0.1% to about 20%, and preferably from about 3% to about 10% by weight of the finished chewing gum. Examples of suitable thickeners include hydrolyzed cereal solids, malto-dextrin, modified food starch, low D.E. corn syrup solids, alginates, carrageenan, xanthan gum, gelatin, carob, tragacanth, locust bean, and other water-soluble gums.

Preferred is malto-dextrin employed in amounts to provide a weight ratio to the aqueous softener ranging from about 2:1 to about 1:1. The addition of the above results in increased body and strength of the aqueous softener which may be necessary for efficient sheeting of the gum.

The aqueous softener (or binder) will contain from about 65 to about 80% and preferably from about 70 to about 75% by weight solids and will be present in an amount from about 2 to about 30%, and preferably from about 5 to about 25% by weight of the chewing gum depending upon the type and amount of sweetener solids present in the softener.

The amount of gum base present will vary depending upon the configuration of the chewing gum product and the type of sweeteners present therein. The gum base should be present in quantities sufficient to make balanced formulas which produce gum which is sufficiently discontinuous to have desirable nougat-like sweetness-flavor release properties, yet at the same time sufficiently continous to allow for processibility into desired shapes or forms.

In the case of sugar-containing chewing gum, the water-soluble phase (aqueous softener-first sweetener) will usually comprise from about 23 to about 80% and preferably from about 30 to about 50% by weight of the chewing gum, whereas the water-insoluble phase (gum base-second sweetener) will comprise from about 20 to about 75% and preferably from about 30 to 70% by weight of the chewing gum. The first sweetener (dispersed in the aqueous softener) as described above will usually be present in an amount from about 20 to about 60% and preferably from about 25 to about 35% by weight, and the second sweetener which may be sugar or other sweetener will be present in an amount within the range of from about 20 to about 45% and preferably from about 25 to about 35% by weight of the chewing gum.

In the case of sugarless chewing gums, the water-soluble phase will usually comprise from about 40 to about 92% and preferably from about 55 to about 88% by weight of the chewing gum, whereas the water-insoluble phase will comprise from about 8 to about 60% and preferably from about 12 to about 59% by weight of the chewing gum.

The first sweetener (dispersed in the aqueous softener) as described above (for example, a sugar alcohol) will be present in an amount from about 25 to about 35% and preferably from about 28 to about 32% by weight, and the second sweetener which may be a sugar alcohol or other non-sugar sweetener will be present in an amount within the range of from about 15 to about 35% and preferably from about 28 to about 32% by weight of the chewing gum.

Where artificial sweeteners are employed in the chewing gum of the invention, whether it be in the water-insoluble gum base phase of in the water-soluble aqueous softener phase, the artificial sweetener will be employed in each in amounts generally used in sugarless gums depending upon the type of artificial sweetener employed. Thus, the artificial sweetener may be employed in either or both phases in amounts ranging from about 0.02 to about 1.0% by weight of the chewing gum product.

It has been found that by controlling gum base concentration in the chewing gum product of the invention, it is possible to optimize sweetener release properties from the chewing gum and thereby maximize the sweetener concentration in the saliva. This is accomplished by decreasing the concentration of gum base so that a short nougat-type structure is obtained. The short nougat type structure is easily torn apart on chewing releasing large amounts of sweetener into the saliva. However, in accordance with the present invention, primarily due to the presence of the hydrogenated starch hydrolysate, the gum base and chewing gum are imparted with sufficient cohesivity to allow it to be processed, rolled, sheeted, scored and cut into sticks without tearing apart and jamming machinery.

In the chewing gum of the invention, the gum base will be present in amounts ranging from about 8 to about 25% by weight of the chewing gum, and preferably from about 12 to about 20% in the case of non-stick shaped chewing gum, for example cube, pillows, balls, blocks, or other types having thick configuration, which optionally may include a sugar or sugarless coating or shell.

Where an outer shell is desired, it may be applied to the chewing gum employed coating techniques well known in the art. The coating or shell may contain corn syrup, dextrose and/or other conventional coating ingredients and may comprise from about 10 to about 20% and preferably from about 12 to about 15% by weight of the final chewing gum product. The coating not only provides additional flavor and sweetness to the chewing gum but also protects the soft gum center and improves overall shelf-life of the gum.

In the case of chewing gum having a stick configuration, because of processing considerations, larger gum base concentrations may be necessary, preferably from about 18 to about 24% by weight of the chewing gum. Thus, chewing gums in accordance with the present invention having stick configurations will not have the short nougat-type structure associated with the aforedescribed non-stick chewing gums because of the increased gum base concentrations required in such stick gums.

As gum base concentration is reduced, the total sweetness of the chewing gum of the invention increases. However, notwithstanding increased sweetness-flavor release, it is essential that cud volumes be maintained at acceptable levels, especially in bubble type gums if the cud volume is too low, the resulting gum may be tiresome to chew; in bubble gum form, a small cud makes it almost impossible to low bubbles using only one stick of gum.

Surprisingly, it has been found that satisfactory cud sizes or volumes may be maintained by incorporating mannitol into the chewing gum of the invention, preferably as the second sweetener or together with another (second) sweetener so that the mannitol is dispersed and sealed in the gum base as described above. The mannitol being only a poorly-soluble sugar alcohol is slow to extract from the gum base and increases the weight and size thereof. In addition, mannitol apparently has the ability to attract water (saliva) into the cud (gum base) thereby increasing its volume and size. In the case of bubble gum containing low amounts of gum base, the presence of mannitol enables bubbles to be blown even using only one stick of gum for the chew. Furthermore, unlike other gum components, mannitol can be tolerated in the bubble gum cud as it will not interfere with the blowing of bubbles, whereas with other sugars and sugar alcohols nearly complete extraction is necessary before the cud becomes suitable for blowing bubbles.

Generally, the lower the gum base concentration, the higher the mannitol concentration required to obtain preferred cud volumes. Amounts of mannitol necessary to produce desired cud volumes will vary from about 10 to about 50% and preferably from about 15 to about 35% by weight in the case of sugarless bubble gums, from about 10 to about 50% and preferably from about 15 to about 35% in the case of sugarless gums, from about 5 to about 30% and preferably from about 10 to about 20% by weight in the case of sugar-containing bubble gums, and from about 5 to about 30% and preferably from about 10 to about 20% by weight in the case of sugar-containing gums.

Preferred are the following formulations:

| Sugar-containing | Range % By Weight of Chewing Gum | |
|---|---|---|
| | Stick | Other |
| A. Water-soluble phase | | |
| Sorbitol syrup (% solids 68 to 72) | 3-10 | 8-12 |
| Sugar | 28-32 | 28-32 |
| Hydrogenated starch hydrolysate (where present) | 3-10 | 3-10 |
| B. Water-insoluble phase | | |
| Gum base | | |
| Bubble gum | 20-25 | 12-20 |
| Regular | 20-25 | 12-20 |
| Sugar | 28-32 | 28-32 |
| Hydrogenated starch hydrolysate (where present) | 2-8 | 2-12 |

| Sugarless | Range % By Weight of Chewing Gum | |
|---|---|---|
| | Stick | Other |
| A. Water-soluble phase | | |
| Sorbitol | 25-35 | 25-35 |
| Sorbitol syrup (% solids 68 to 72) | 18-30 | 18-30 |
| Hydrogenated starch hydrolysate (where present) | 1-10 | 1-10 |
| B. Water-insoluble phase | | |
| Gum base | | |
| Bubble gum | 18-25 | 12-20 |
| Regular | 18-25 | 12-20 |
| Sorbitol or mannitol | 20-30 | 20-30 |
| Hydrogenated starch hydrolysate (where present) | 1-8 | 1-12 |

Where the chewing gum of the invention is to include a natural sweetener such as sugar or sorbitol or mannitol, the natural sweetener will be added to the melted gum base (prior to adding polyhydric alcohol plasticizer or other materials in which the natural sweetener is soluble) in an amount within the range of from about 10 to about 80% and preferably from about 15 to about 60% by weight of the total natural sweetener concentration in the chewing gum.

In forming the gum base combination with natural sweetener (as the second sweetener), the gum base material will be employed in a weight ratio to the natural sweetener of within the range of from about 1.8 to about 0.45 and preferably from about 0.9 to about 0.6 so as to provide a concentration of natural sweetener buried in the gum base within the range of from about 55 to about 250% by weight of the gum base, and preferably from abut 110 to about 200% by weight of the gum base.

In preparing the second sweetener-gum base combination, it is preferred that powdered sweetener (or perhaps even liquid sweetener) be employed to expedite dispersion or dissolution in the gum base. However, larger particle sizes may be used if the mixing time is increased to effect solubilization or milling during the mixing operation. A mixing time of no less than 2 (and preferably about 3) minutes will be employed to effect a uniform distribution of the sweetener in the gum base when conventional chewing gum sigma blade mixers are used. However, this mixing time may be shortened if more efficient mixing methods are employed.

In general, the gum base is prepared by heating and blending natural gums, synthetic resins, waxes, plasticizers, etc., in a manner well known in the art. Typical examples of the ingredients found in a chewing gum base are masticatory substances of synthetic origin such as styrene-butadiene copolymer, isobutylene-isoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 5 to about 15%, preferably from about 8 to about 12%, and optimally from about 9 to about 11% by weight of the gum base composition.

In addition, the gum base will preferably contain a solvent for the elastomer which should have minimal tackifying properties and will preferably comprise hydrogenated ester gum, that is, glycerol ester of hydrogenated rosin and/or dimerized ester gum.

Other conventional ingredients which may be present in the gum base include a hydrophilic-type detackifier which will sorb saliva and become slippery and is incompatible with the elastomer and solvent for the elastomer, such as polyvinyl acetate, polyvinyl butyl ether, copolymers of vinyl esters and vinyl ethers.

The gum base may also include hard waxes which serve as lubricants and should have a melting point of above about 65° C. and preferably above about 75° C. Examples of such hard waxes include candelilla wax, paraffin wax, carnauba wax, ozokerite, oricury, microcrystalline wax, and the like.

The gum base may also include a softening agent and lubricant combination which may comprise one or more hydrogenated vegetable or animal fats having a high melting point, that is, above about 22° C.

The gum base will also include an emulsifier to impart hydrophilic properties to the gum base so that saliva will be absorbed thereby making the gum base slippery. Examples of such emulsifiers include glyceryl monostearate, phosphatides, such as lecithin and cephalin, Tweens, Spans and mixtures thereof.

In addition, the gum base may include colorants such as titanium dioxide, plasticizers, such as lanolin, stearic acid, sodium stearate, potassium stearate and the like, antioxidants, in an amount up to about 1000 ppm of the gum base, such as butylated hydroxytoluene, butylated hydroxy anisole and propyl gallate.

The gum base may also contain particles of chalk ($CaCO_3$) as a bulking agent and texturizer in amounts ranging from about 0 to about 75%, and preferably from about 0.2 to about 25% by weight of the gum base. However, where the gum base is to be employed in a substantially calorie-free gum, the gum base may include from about 32 to about 75% and preferably from about 35 to about 70% by weight texturizing agent or inert filler. Examples of texturizing agents or inert filling suitable for use herein include calcium carbonate, aluminum hydroxide, alumina, magnesium carbonate, talc, aluminum silicates and mixtures thereof. In addition, the gum base may be mixed with artificial sweetener and/or food acids as set out herein to provide initial burst of sweetness or sourness and/or prolongation of sweetness.

The water-insoluble gum base may consist of any of the various bases disclosed for example in U.S. Pat. Nos. 3,052,552 and 2,197,719.

The chewing gum of the invention may include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives. The above flavors may be added with the aqueous softener and be a part of the water-soluble phase and/or added with the second sweetener to the gum base and be a part of the so-called water-insoluble phase.

In order to provide an initial taste or sensation or sourness, the chewing gum of the invention may also contain food acid such as citric acid, tartaric acid, malic acid, and the like, in an amount ranging from about 0.3 to about 2.0% by weight, and preferably from about 0.5 to about 1.2% by weight of the final gum product. Such food acid may be added to the gum with the aqueous softener or water-soluble phase, in order to facilitate initial sourness. In addition, insoluble acids such as fumaric or encapsulated soluble acids may be added with the second sweetener and buried in the gum base in order to sustain lasting sourness.

The following Examples represent preferred embodiments of the present invention.

EXAMPLE 1

The following sugarless formulation is prepared as described below:

| Ingredient | Parts by Weight |
| --- | --- |
| Gum base | 21 |
| Sorbitol powder (2nd sweetener) | 28 |
| Sorbitol powder (1st sweetener) | 28 |
| Flavor oil | 1.6 |
| Flavor spray dried | 0.5 |
| Lecithin | 0.4 |
| Sorbitol liquid (70% solids aqueous softener) | 12 |
| Hydrogenated starch hydrolystate (9% sorbitol, 58% maltitol, 33% higher saccharides) | 8 |
| Color | 0.07 |

The above chewing gum is prepared by adding the gum base to a steam kettle equipped with a sigma blade mixer. The gum base is melted and then allowed to cool to 200° F. Lecithin and color are added and thoroughly mixed into the melted gum base for 1-2 minutes. One-half of the sorbitol powder and one-half of the flavor oil are added and mixed for 2-3 minutes. The hydrogenated starch hydrolysate is added and mixed for 2 minutes. Thereafter, while the gum base-sorbitol-hydrogenated starch hydrolysate mix is a continuous mass and folding well, the remaining sorbitol powder and flavor oil are added and mixed for 2 minutes. The mix is torn up into discrete pieces during mixing. The sorbitol syrup is added and mixing is continued for about 3-4 minutes and then the spray dried flavor is added and mixed until the batch appears to be smooth and homogeneous.

The chewing gum prepared above wherein sorbitol and hydrogenated starch hydrolysate are dispersed throughout and sealed in the gum base is found to have a pleasant sweet taste. In addition, the chewing gum has improved processing characteristics allowing for sheeting and the making of stick gum.

EXAMPLE 2

The following sugarless formulation is prepared as described below:

| Ingredient | Parts by Weight |
| --- | --- |
| Gum base | 22 |
| Mannitol (2nd sweetener) | 15 |
| Sorbitol powder (1st sweetener) | 30 |
| Flavor oil | 1 |
| Lecithin | 0.05 |
| Sorbitol liquid (70% solids aqueous softener) | 23 |
| Hydrogenated starch hydrolysate (8% sorbitol, 8% maltitol, 84% higher saccharides) | 2 |

The above chewing gum is prepared by adding the required amount of gum base to a mixer as described in Example 1, melting the gum base, allowing the gum base to cool to 200° F. The second sweetener is added and thoroughly mixed into the melted gum base for 3 minutes. Flavor oil and lecithin are added and mixed for 3 minutes. Thereafter, while the gum base-second sweetener mix is a continuous mass and folding well, sorbitol powder is added and mixed for 3 minutes. The mix is torn up into discrete pieces during mixing. The sorbitol syrup and the hydrogenated starch hydrolysate in the sorbitol syrup phase is found to have a pleasant sweet taste and sufficient cohesivity so as to allow for processing in standard rolling, sheeting, scoring and cutting machinery without clogging the machinery.

EXAMPLE 3

The following sugarless gum formulation is prepared as described below:

| Ingredient | Parts by Weight |
| --- | --- |
| Gum base | 18 |
| Sorbitol powder | 33 |
| Sorbitol syrup (75% solids) | 20 |
| Mannitol | 25 |
| Hydrogenated starch hydrolysate (8% sorbitol, 8% maltitol, 84% higher saccharides) | 2 |
| Peppermint oil | 1 |
| Yelkin (Lecithin) | 0.5 |

The above chewing gum is prepared by adding the required amount of gum base to a mixer as described in Example 1, melting the gum base, allowing the gum base to cool to 200° F. Lecithin is added with mixing. Mannitol is added and thoroughly mixed into the melted gum base for 3 minutes. Thereafter, while the gum base-second sweetener mix is a smooth continuous mass and folding well, sorbitol powder is added and mixed for 3 minutes. Peppermint oil is added midway through the sorbitol addition. The mix is torn up into discrete pieces during mixing. The sorbitol syrup and the hydrogenated starch hydrolysate are added and mixing is continued for about 3 minutes until the batch appears to be smooth and homogenous.

The chewing gum prepared above including hydrogenated starch hydrolysate in the sorbitol syrup phase is found to have a pleasant sweet tast. It has superior rolling qualities and sheet strength. Sticks have good flexibility without breaking.

What is claimed is:

1. A chewing gum having a prolonged sweet taste comprising a water-soluble phase comprised of aqueous softener in an amount of from about 2 to about 30% by weight of the chewing gum, a first sweetener in particulate form in an amount from about 20 to about 60% by weight of the chewing gum, an optionally hydrogenated starch hydrolysate in an amount of from about 0 to about 20% by weight of the chewing gum dispersed throughout the aqueous softener; and a relatively water-insoluble phase comprised of a plurality of separate and distinct masses suspended in and dispersed throughout the water-soluble phase, each of said masses comprising gum base, a second sweetener in particulate form, and optionally hydrogenated starch hydrolysate enveloped by said gum base, said gum base being present in an amount of from about 8 to about 25% by weight of the chewing gum, said second sweetener being present in an amount of from about 20 to about 45% by weight of the chewing gum, said hydrogenated starch hydrolysate being present in an amount of from about 0 to about 15% by weight of the chewing gum, provided that the hydrogenated starch hydrolysate is present in at least one of said phases, the water-soluble phase providing initial sweetness impact, the gum base providing a protective vehicle for the second sweetener to control and slow down release of the second sweetener, thereby providing extended sweetness after the initial sweetness impact has subsided, while the hydrogenated starch hydrolysate imparts cohesivity to the chewing gum thereby facilitating processibility thereof.

2. The chewing gum as defined in claim 1 wherein said hydrogenated starch hydrolysate is present in said gum base.

3. The chewing gum as defined in claim 2 wherein said hydrogenated starch hydrolysate is present in amounts ranging from about 0.5 to about 15% by weight of said chewing gum.

4. The chewing gum as defined in claim 1 wherein said hydrogenated starch hydrolysate is present in said aqueous softener.

5. The chewing gum as defined in claim 4 wherein said hydrogenated starch hydrolysate is present in an amount ranging from about 0.1 to about 20% by weight of said chewing gum.

6. The chewing gum as defined in claim 1 wherein said first sweetener is a natural sweetener.

7. The chewing gum as defined in claim 1 wherein said second sweetener is a natural sweetener.

8. The chewing gum as defined in claim 1 wherein said first sweetener is a natural sweetener and said second sweetener is a natural sweetener.

9. The chewing gum as defined in claim 1 wherein said first sweetener comprises a sugar, a sugar alcohol or mixtures thereof, and said second sweetener comprises a sugar or sugar alcohol or mixtures thereof.

10. The chewing gum as defined in claim 5 wherein said aqueous softener comprises sorbitol syrup, maltitol syrup, xylitol, corn syrup or mixtures thereof.

11. The chewing gum as defined in claim 1 wherein said second sweetener is sucrose, xylitol, mannitol, sorbitol, fructose syrup, glucose, glycyrrhizin, monoammonium salt of glycyrrhizin, calcium salt of glycyrrhizin, mono-, di- or tri-sodium salt of glycyrrhizin, mono-, di- or tri-potassium salt of glycyrrhizin, calcium saccharin, sodium saccharin, ammonium saccharin, dihydrochalcones, neohesperidin dihydrochalcone, aspartame, cyclamate salts, *Stevia rebaudiana, Richardella dulcifica, Dioscoreophyllum cumminsii,* and mixtures thereof.

12. The chewing gum as defined in claim 9 wherein said natural sweetener further includes xyltiol.

13. The chewing gum as defined in claim 1 wherein said aqueous softener is sorbitol syrup.

14. The chewing gum as defined in claim 1 wherein said first sweetener is mannitol.

15. The chewing gum as defined in claim 14 wherein said aqueous sweetener is sorbitol syrup and said second sweetener is powdered sorbitol.

16. The chewing gum as defined in claim 14 wherein said first sweetener further comprises powdered sorbitol.

17. The chewing gum as defined in claim 1 wherein said gum base is present in an amount within the range of from about 12 to about 25% by weight of the chewing gum.

18. The chewing gum as defined in claim 1 further including one or more thickeners for said aqueous softener.

19. The chewing gum as defined in claim 18 wherein said thickener is malto-dextrin, hydrolyzed cereal solids, modified food starch, low D.E. corn syrup solids, alginates, carrageenan, xanthan gum, gelatin, carob, tragacanth, locust bean or other water-soluble gums.

20. The chewing gum as defined in claim 1 further including one or more food acids.

21. The chewing gum as defined in claim 20 wherein said food acid is fumaric acid, citric acid, malic acid, tartaric acid, or mixtures thereof.

22. The chewing gum as defined in claim 1 wherein said first sweetener is sorbitol powder, said aqueous softener is sorbitol syrup, and said second sweetener is mannitol, sorbitol or mixtures thereof.

23. The chewing gum as defined in claim 1 wherein said first sweetener is sucrose, said aqueous softener is sorbitol syrup and said second sweetener is sucrose.

24. A method for forming a chewing gum as defined in claim 1 which comprises interdispersing in melted gum base particles of a second sweetener and optionally hydrogenated starch hydrolysate to form a continuous phase, and thereafter mixing the continuous phase with a first sweetener causing the continuous phase to be torn into discrete masses of gum base enveloping said particles of second sweetener and optionally hydrogenated starch hydrolysate, and mixing aqueous softener and optionally hydrogenated starch hydrolysate with the mixture of said discrete masses and first sweetener form a chewing gum which is smooth and continuous, provided that hydrogenated starch hydrolysate is added at least to the melted gum base or to the discrete masses of gum base and second sweetener.

25. The method as defined in claim 24 including the step of adding hydrogenated starch hydrolysate to said continuous phase before said first sweetener is added.

26. The method as defined in claim 24 including the step of adding hydrogenated starch hydrolysate to said discrete masses of gum base and second sweetener.

27. The chewing gum as defined in claim 1 including sugar as a sweetener and wherein said water-soluble phase comprises from about 23 to about 80% by weight of the chewing gum, and said water-insoluble phase comprises from about 20 to about 75% by weight of the chewing gum.

28. The chewing gum as defined in claim 1 wherein said chewing gum is a sugarless gum said water-soluble phase comprises from about 40 to about 92% by weight of the chewing gum, and said water-insoluble phase comprises from about 8 to about 60% by weight of the chewing gum.

29. The chewing gum as defined in claim 28 wherein said first sweetener is present in an amount within the range of from about 25 to about 35% by weight of the chewing gum, and said second sweetener is present in an amount with the range of from about 15 to about 35% by weight of the chewing gum.

30. The chewing gum as defined in claim 1 including an outer edible sugar containing or sugarless shell.

31. The chewing gum as defined in claim 1 wherein said second sweetener comprises the free acid form of saccharin.

* * * * *

UNITED STATES PATENT AND TRADEMARK OFFICE
CERTIFICATE OF CORRECTION

PATENT NO. : 4,208,431
DATED : June 17, 1980
INVENTOR(S) : Dominick R. Friello et al.

It is certified that error appears in the above-identified patent and that said Letters Patent are hereby corrected as shown below:

```
Column 1, line 43, "if" should read --it--.
Column 2, line 36, "latter" should read --later--.
Column 6, line 59, "of" should read --or--.
Column 7, line 18, "cube" should read --cubes--.
Column 10, line 2, "ing" should read --ers--.
Column 12, line 23, "tast" should read --taste--.
Column 12, line 32, "an" should read --and--.
Column 14, line 21, after "sweetener" and before "form",
   insert --to--.
Column 14, line 39, after "gum" second occurrence and
   before "said" second occurrence, insert --and--.
```

Signed and Sealed this

Fourth Day of November 1980

[SEAL]

Attest:

SIDNEY A. DIAMOND

Attesting Officer

Commissioner of Patents and Trademarks